(12) United States Patent
DiMascio et al.

(10) Patent No.: US 8,287,238 B2
(45) Date of Patent: Oct. 16, 2012

(54) HUB PITCH GEAR REPAIR METHOD

(75) Inventors: Paul Stephen DiMascio, Greer, SC (US); Ryan Close, Greenville, SC (US); Gunther Auer, Irun (ES); Robert Grimley, Greer, SC (US); Alan Hamel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1175 days.

(21) Appl. No.: 12/040,075

(22) Filed: Feb. 29, 2008

(65) Prior Publication Data

US 2009/0220343 A1    Sep. 3, 2009

(51) Int. Cl.
*B63H 3/00* (2006.01)

(52) U.S. Cl. .................... 416/170 R; 415/129

(58) Field of Classification Search ........... 29/889.1, 29/893.3, 893.35; 415/129, 130; 416/147, 416/155, 156, 158, 159, 162, 170 R, 174
See application file for complete search history.

(56) References Cited

U.S. PATENT DOCUMENTS

| | | | |
|---|---|---|---|
| 1,636,670 A * | 7/1927 | Shaw et al. ............. 29/893.35 |
| 2,702,086 A * | 2/1955 | Haines ..................... 416/47 |
| 2,707,884 A * | 5/1955 | Boisvert ................... 74/448 |
| 2,786,648 A * | 3/1957 | Ledwith .................. 416/221 |
| 3,216,699 A * | 11/1965 | Schoenborn ............. 416/190 |
| 3,383,095 A * | 5/1968 | Anderson ............ 416/220 R |
| 3,439,551 A * | 4/1969 | Militana ................. 474/162 |
| 3,739,892 A * | 6/1973 | Liberty, Jr. ............. 29/893.2 |
| 3,755,877 A * | 9/1973 | Thompson ............ 29/402.13 |
| 3,876,334 A * | 4/1975 | Andrews ................ 416/147 |
| 3,888,357 A * | 6/1975 | Bauer et al. .............. 74/448 |
| 3,972,106 A * | 8/1976 | Orr ......................... 29/893 |
| 4,465,411 A * | 8/1984 | Boyce et al. ............. 29/893 |
| 5,140,737 A * | 8/1992 | Noland ................ 29/402.13 |
| 6,071,204 A * | 6/2000 | Jefferies et al. ......... 474/161 |
| 6,125,713 A * | 10/2000 | Langlois et al. ......... 74/450 |
| 7,086,834 B2 * | 8/2006 | LeMieux ................ 416/1 |
| 7,322,794 B2 * | 1/2008 | LeMieux et al. ........ 416/40 |
| 7,331,761 B2 * | 2/2008 | Hansen et al. ........... 416/11 |
| 7,335,128 B2 * | 2/2008 | Flamang et al. .... 416/170 R |
| 7,614,850 B2 * | 11/2009 | Rogall .................. 416/155 |
| 2004/0151577 A1 * | 8/2004 | Pierce et al. ............ 415/4.1 |
| 2005/0196280 A1 * | 9/2005 | Gonzalez et al. ....... 416/131 |
| 2005/0254949 A1 * | 11/2005 | Schubert ............ 416/170 R |

OTHER PUBLICATIONS

Office Action dated May 3, 2012, in corresponding Chinese Patent Application No. 2009007905.0 (9 pgs.).

* cited by examiner

*Primary Examiner* — Edward Look
*Assistant Examiner* — Adam Benson
(74) *Attorney, Agent, or Firm* — McNees Wallace & Nurick LLC (57) ABSTRACT

A method for repairing a hub pitch gear assembly. The method includes providing a ring assembly for adjusting a pitch angle of a wind turbine blade having a plurality of gear teeth. A segment of the ring assembly is removed, the segment including at least a portion of at least one gear tooth, to form a repair cavity. A repair segment configured to mate the repair cavity is provided and the repair segment is directed into the repair cavity and fastened in position. A repaired pitch gear assembly and wind turbine are also provided.

20 Claims, 11 Drawing Sheets

HUB PITCH GEAR REPAIR METHOD

FIELD OF THE INVENTION

The present invention is directed to methods for servicing, repairing, and/or replacing components of wind turbines. In particular, the present invention is directed to on-site methods for repairing or servicing hub pitch gear assemblies.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid. In order to provide the efficient conversion of mechanical energy to electrical energy, the wind turbine utilizes a variety of wind turbine components, such as shafts, gearing components, pitch drives, generator components and other components within the wind turbine. Such gears are subject to wear or damage, requiring servicing or repair.

Components in the wind turbine typically have to be installed, serviced or replaced using mobile land, or ocean-based cranes and/or manually carrying components to remove and/or replace components. Further, wind turbines may be installed on uneven terrain, in the ocean, and/or on very high towers (e.g., towers that are at least 60 meters in height) that are not easily accessible to mobile land-based or ocean-based cranes. In addition, operation of these large cranes is expensive and can require long lead times Therefore, what is needed is an inexpensive method for servicing or repairing gear assemblies in wind turbines that is portable, lightweight and/or is capable of operation on-site and up-tower.

SUMMARY OF THE INVENTION

One aspect of the present disclosure includes a method for repairing a hub pitch gear assembly. The method includes providing a ring gear repair segment with a plurality of gear teeth. A portion of the original ring gear is removed through cutting, machining, and/or drilling to form a repair cavity. The repair segment, which is configured to mate the repair cavity, is provided and the repair segment is directed into the repair cavity and fastened in position.

Another aspect of the present disclosure includes a repaired pitch gear assembly including a pinion assembly having a plurality of gear teeth. The assembly further includes a ring gear assembly for adjusting the pitch angle of a wind turbine blade having a plurality of gear teeth configured to mesh the gear teeth of the pinion assembly. The ring assembly includes a repair segment fastened thereto. The repair segment being fastened to the ring assembly.

Still another aspect of the present disclosure includes a wind turbine having a wind turbine blade having an adjustable pitch angle. The wind turbine further includes repaired pitch gear assembly operably disposed to adjust the pitch angle of the wind turbine blade. The repaired pitch gear assembly includes a pinion assembly having a plurality of gear teeth. The assembly further includes a ring assembly for adjusting a pitch angle of a wind turbine blade having a plurality of gear teeth configured to mesh the gear teeth of the pinion assembly. The ring assembly includes a repair segment fastened thereto. The repair segment being fastened to the ring assembly.

One advantage of the present disclosure is that the method permits repair of worn wind turbine pitch gear teeth in-situ. Additionally, the repair segment can be manufactured with hardened teeth to provide longer wear.

Further, embodiments of this disclosure allow the pitch gear to be repaired without the removal of the turbine blades and/or pitch gear and does not require welding or large equipment.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
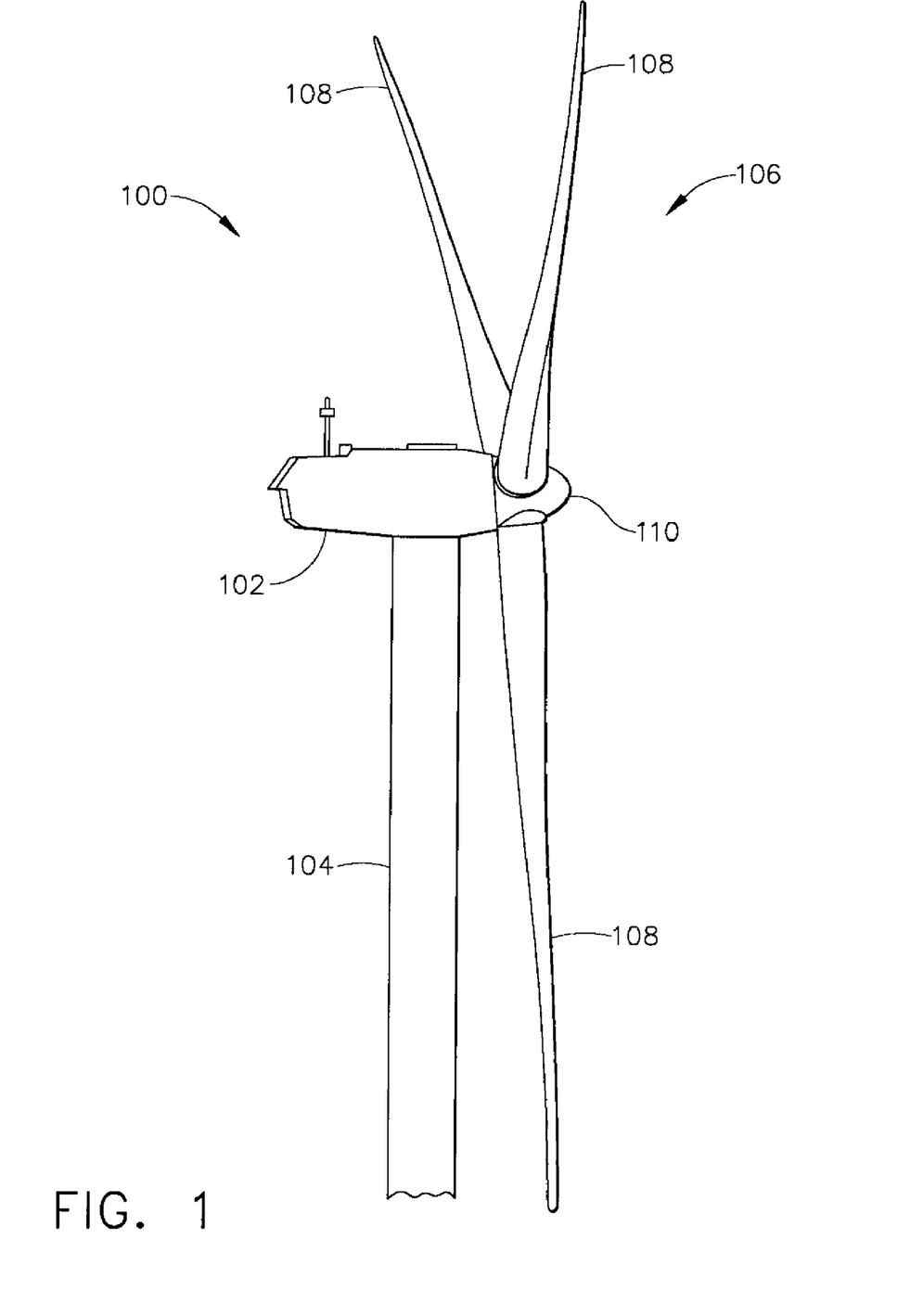
FIG. 1 is a side view of a wind turbine according to an embodiment of the present disclosure.

As shown in FIG. 1, a wind turbine 100 generally comprises a nacelle 102 housing a generator (not shown in FIG.

1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
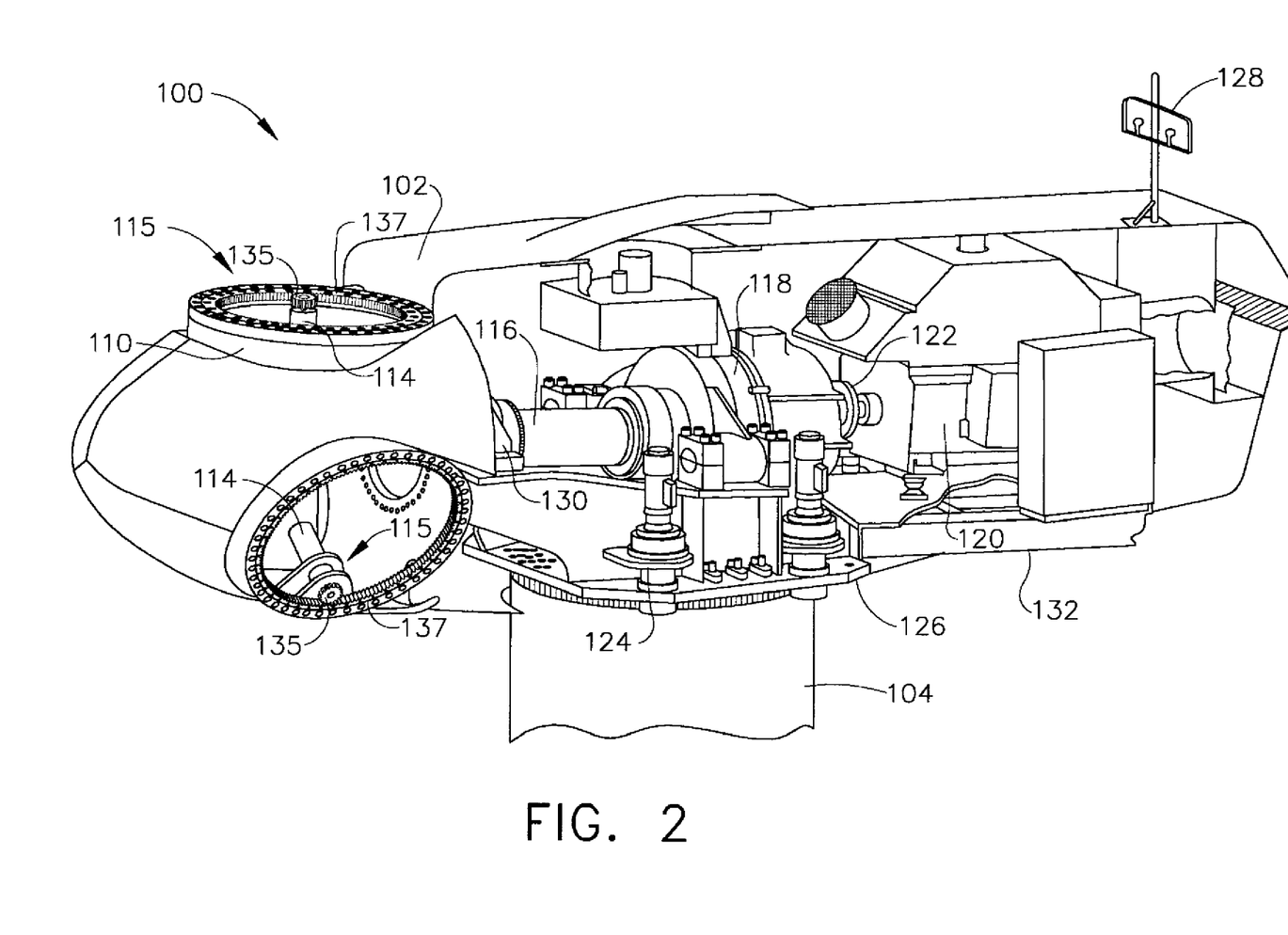
FIG. 2 shows a cutaway view of a nacelle according to an embodiment of the present invention.

As shown in FIG. 2, various components are housed in nacelle 102 atop tower 104 of wind turbine 100. For example, a variable pitch gear assembly 115 may control the pitch angle of blades 108 (not shown in FIG. 2) that drive hub 110 as a result of wind. Pitch angle adjustment of blades 108 is a conventional operational parameter and the arrangement of gearing and motors/drives to adjust the pitch angle is well-known. Hub 110 may be configured to receive three blades 108, but other configurations may utilize any number of blades. In some configurations, the pitches of blades 108 are individually controlled by pitch gear assembly 115. Hub 110 and blades 108 together comprise wind turbine rotor 106.

The drive train of the wind turbine 100 includes a main rotor shaft 116 (also referred to as a "low speed shaft") connected to hub 110 via main bearing 130 and (in some configurations), at an opposite end of shaft 116 to a gear box 118. Gear box 118, in some configurations, utilizes a dual path geometry to drive an enclosed high speed shaft. In other configurations, main rotor shaft 116 is coupled directly to generator 120. The high speed shaft (not shown in FIG. 2) is used to drive generator 120, which is mounted on main frame 132. In some configurations, rotor torque is transmitted via coupling 122. Generator 120 may be of any suitable type, for example and without limitation, a wound rotor induction generator or a direct drive permanent magnet generator. Yaw drive 124 and yaw deck 126 provide a yaw orientation system for wind turbine 100 to rotate the wind turbine to a position that faces the wind. Meteorological boom 128 provides information for a turbine control system, including wind direction and/or wind speed. In some configurations, the yaw system is mounted on a flange provided atop tower 104.

The pitch gear assembly 115 is a ring and pinion gear arrangement driven by blade pitch drive 114, having a circular pinion assembly 135 engaging a ring assembly 137. The ring assembly 137 is a single gear with multiple gear teeth arranged in a substantially arcuate arrangement and connected to the blade 108 in a manner that permits adjustment of the pitch of blades 108. The teeth of the pinion assembly 135 mesh with the teeth of the ring assembly 137 and translate the rotational motion provided by the pitch drive 114 through the pinion assembly 135 into the rotational motion of the ring portion 137 that corresponds to pitch angles for the blade 108.

Figure 3:
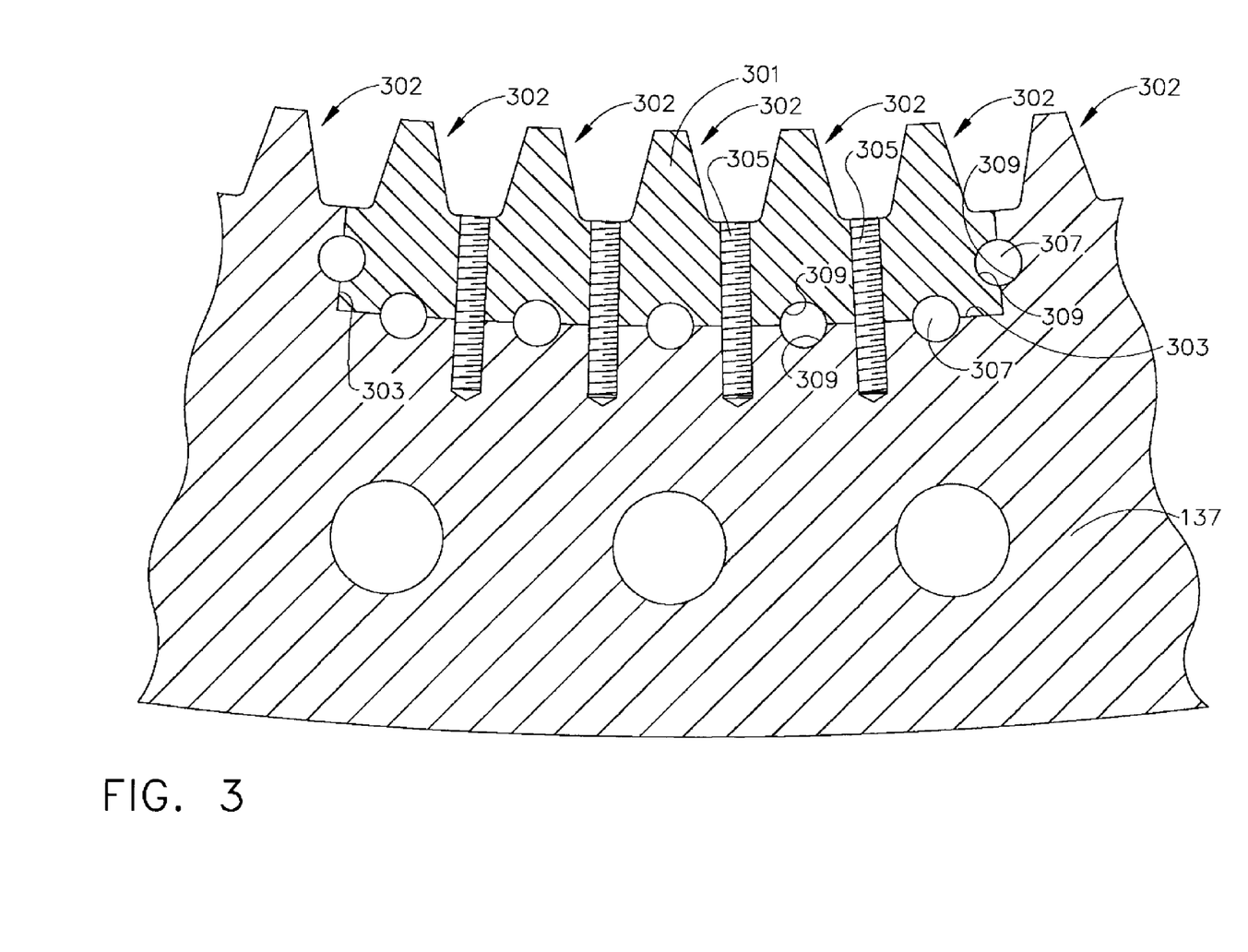
FIG. 3 shows an elevational side view of a repaired ring gear assembly according to an embodiment of the present disclosure.

One embodiment of the present disclosure permits the removal and replacement of a worn portion of one or more of the gear teeth 302 and ring assembly 137 in-situ, without welding of the ring assembly and/or removal of the blades 108 or other major wind turbine components. FIG. 3 shows a repaired ring assembly 137 having a plurality of gear teeth 302. The ring assembly 137 includes a repair segment 301 disposed within a repair cavity 303. The geometry of gear teeth 302 is not limited to the geometry shown and may include any geometry that meshes the gear teeth of the pinion assembly 135 (not shown in FIG. 3). The repair cavity 303 is formed in a portion of the ring assembly 137 and may include at least one gear tooth 302 having a damaged or otherwise undesirable geometry. The repair cavity 303 includes a cavity or a portion of the ring assembly 137 that has been removed. The area removed from the ring assembly 137 (i.e., the repair cavity 303) may include damage on the ring assembly 137 or tooth or teeth 302. Damage may include chipping, damage from impact, wear or any other damage that may render the teeth 302 undesirable. The machining or removal preferably takes place inside the turbine hub 110 in situ with little or no equipment removal from the wind turbine 100. The damaged portion of the pitch gear assembly 115 is removed through milling, drilling or other material removal process, for example with a portable milling machine. A repair segment 301 is formed by machining or otherwise forming a component having a mating geometry to the repair cavity 303 and the desired teeth 302 geometry. The geometry of the teeth 302 may include the geometry shown in FIG. 3 or any other geometry that is capable of meshing with the pinion assembly 135 of the pitch gear assembly 115. The formation of the repair segment 301 may take place in the wind turbine, near the wind turbine or at a remote location. The repair cavity 303 and repair segment 301 may include features, such as apertures, threaded openings configured to receive fasteners, protrusions, indentations or features having other geometries that assist and/or facilitate fastening and/or alignment of the repair segment 301. While not so limited, the features may include slots 309 or openings for fasteners 305. The material making up the repair segment 301 may be the same or different than the material of the ring assembly 137. For example, one material may be a material having a high hardness. Further, the configuration of teeth 302 may be the same or different than the configuration of the teeth on the ring assembly 137.

To attach repair segment 301, a plurality of fasteners 305 may be installed in through the repair segment into the ring assembly 137. Fasteners 305 may include any suitable fastening device including screws, bolts, clips, adhesive device or any other fastening device capable of fastening the repair segment 301 to the ring assembly 137. In the embodiment shown in FIG. 3, a plurality of slots 309 are formed into the repair segment 301 and the ring portion 137. A plurality of dowel pins 307 are inserted into the slots 309 intermediate the repair segment 301 and the ring assembly 137. The positioning of the dowel pins 307 provides retention of the repair segment and distributes loads applied during pitch gear assembly 115 operation to further resist disengagement of the repair segment 301 from the ring assembly 137. The fasteners 305 and dowel pins 307 attach the repair segment 301 to the ring assembly 137 in addition to any interference fit between the two components.

Figure 4:
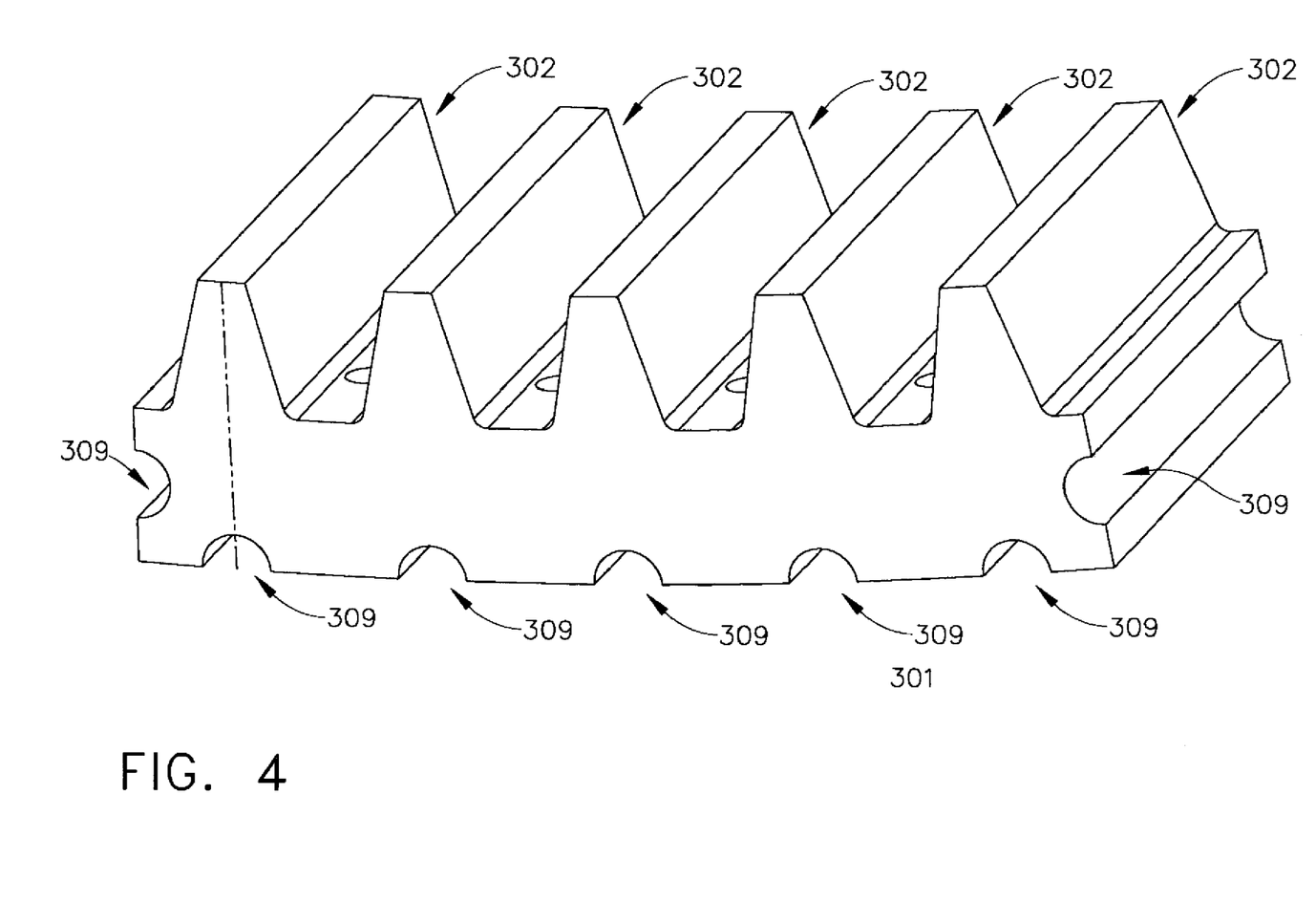
FIG. 4 shows a top perspective view of a repair segment according to an embodiment of the present disclosure.

FIG. 4 shows a perspective view of a repair segment 301 according to an embodiment of the disclosure. As shown, the repair segment 301 includes a plurality of slots or holes 309 configured to receive a dowel pin 307. The slots 309 may be machined into the repair segment 301 using any suitable machining technique including drilling or milling the corresponding geometry in to the repair segment 301. The slots or holes 309 that are formed engage a portion of the dowel pin 307, wherein the dowel pin 307 further engages the dowel pin slot 309 in the ring assembly 137.

Figure 5:
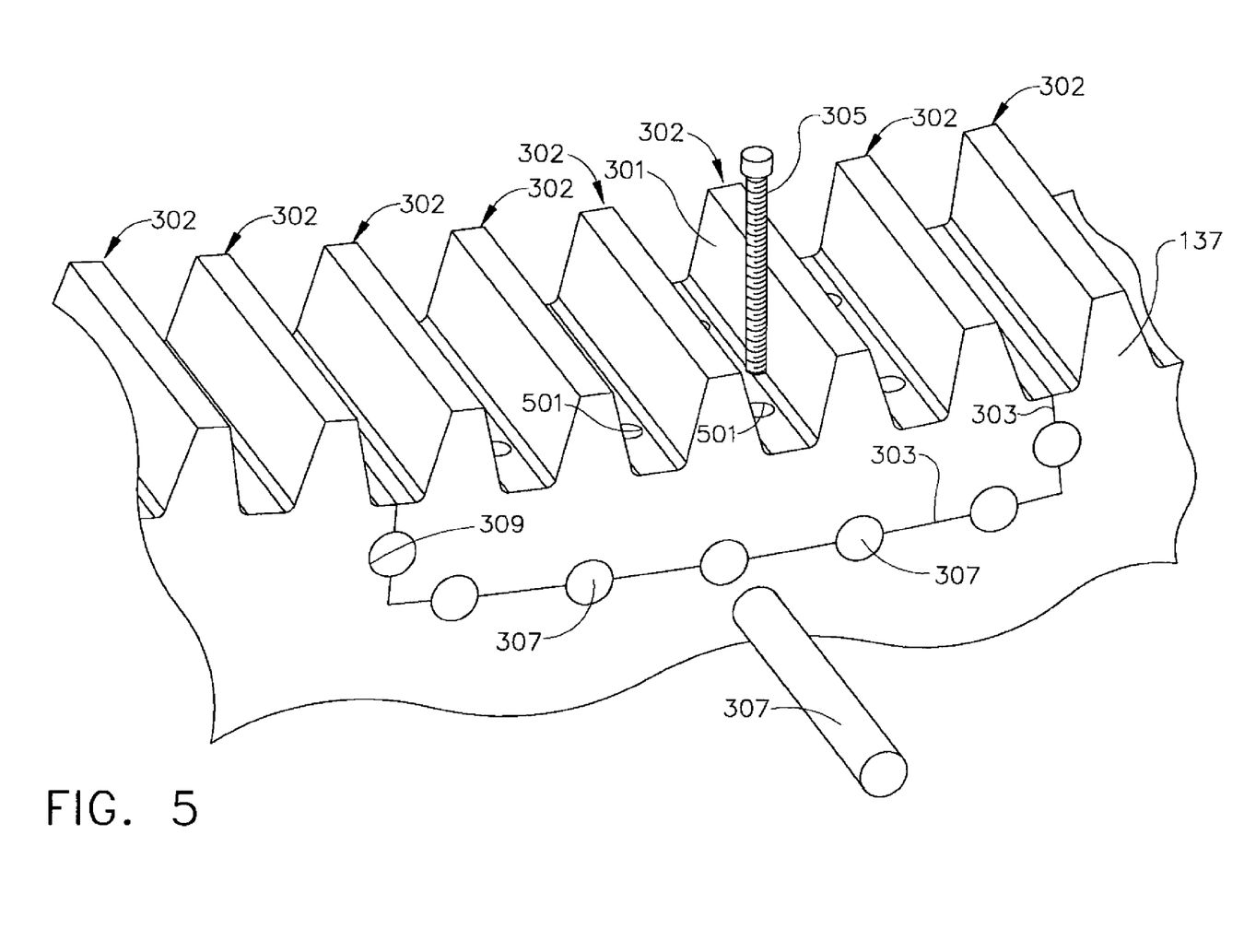
FIG. 5 shows a top perspective view of a repaired ring gear assembly according to an embodiment of the present disclosure.

FIG. 5 shows a perspective view of a repair segment 301 during installation into a ring assembly 137 according to an embodiment of the disclosure. As shown, the repair segment 301 is positioned into repair cavity 303 and fasteners 305 and dowel pins 307 are installed in fastener openings 501 and slots 309, respectively. The fastened repair segment 301 may be brought into meshing engagement with the pinion assembly 135 (not shown in FIG. 5) and the wind turbine may be returned to service.

Figure 6:
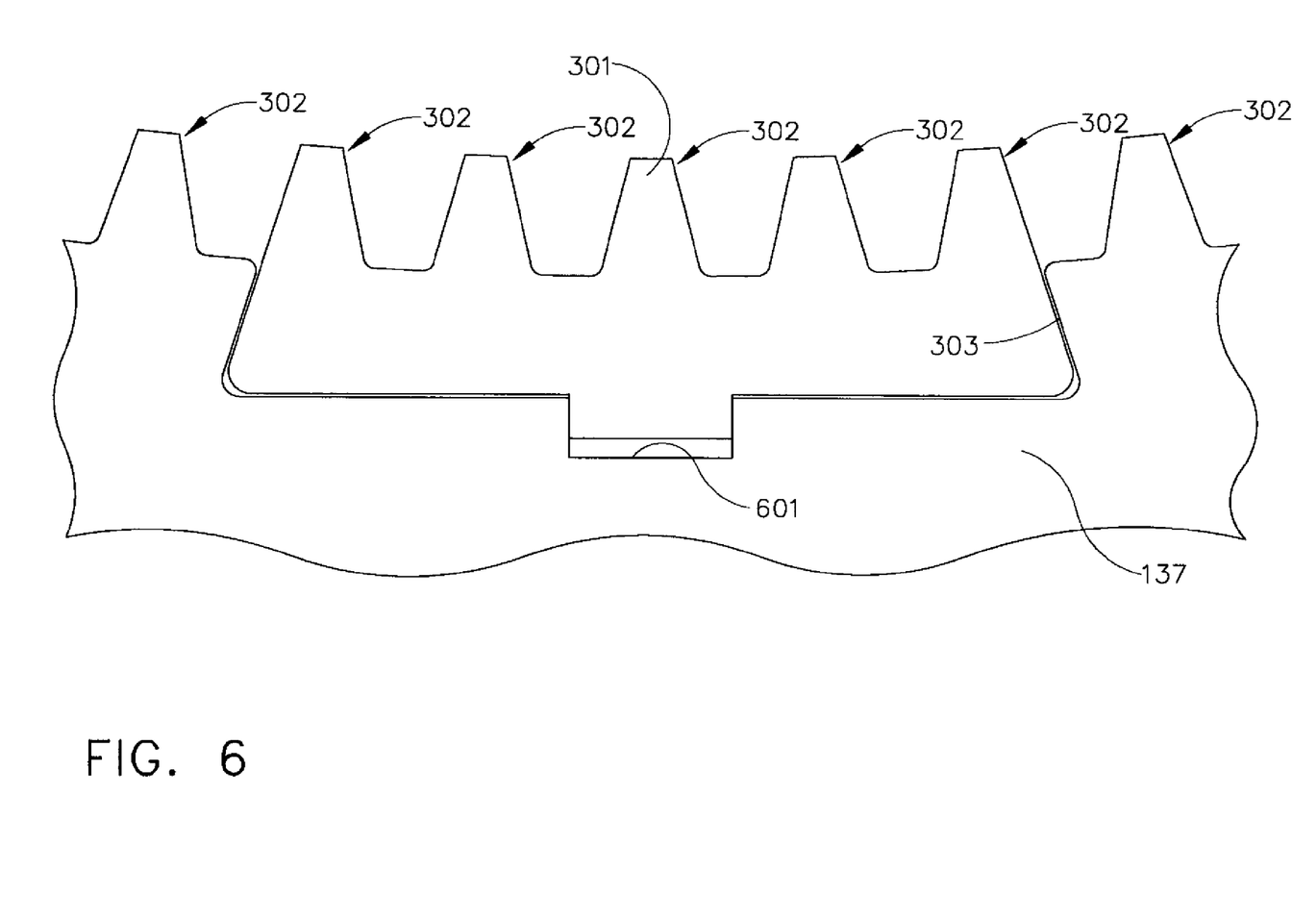
FIG. 6 shows an elevational side view of a repaired ring gear assembly according to another embodiment of the present disclosure.

FIG. 6 shows an alternate embodiment of the disclosure including a repair segment 301 having dovetail geometry. While the geometry is shown as a dovetail arrangement, the arrangement may include a feature including any interlocking geometry that is capable of maintaining an engaged interlocking fit. The repair segment 301 is positioned within the repair cavity 303, which has a corresponding or mating geometry to the repair segment 301. As shown, the dovetail feature of the repair segment 301 provides the mating geometry with the dovetail slot feature of the repair cavity 303. The repair cavity 303 further includes a clip slot 601 that is configured to receive a clip 701 (see FIGS. 7-9).

Figure 7:
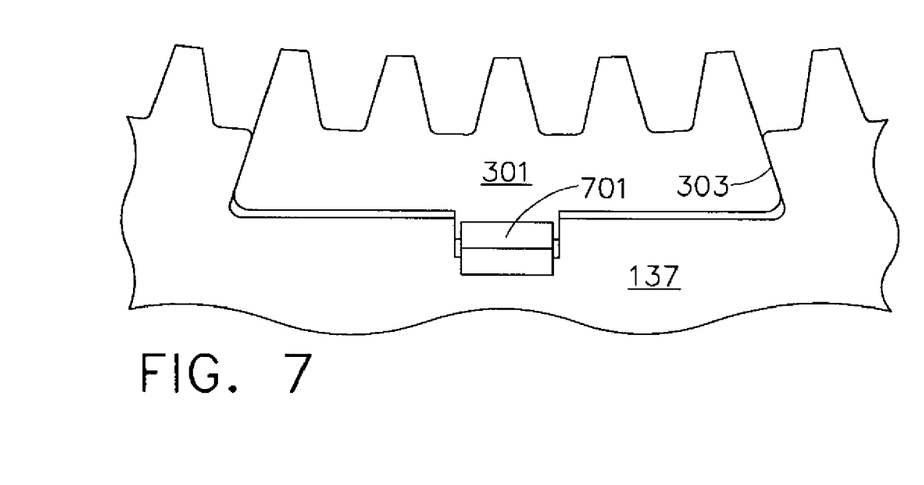
FIG. 7 shows an elevational side view of a repaired ring gear assembly including a clip according to an embodiment of the present disclosure.
Figure 8:
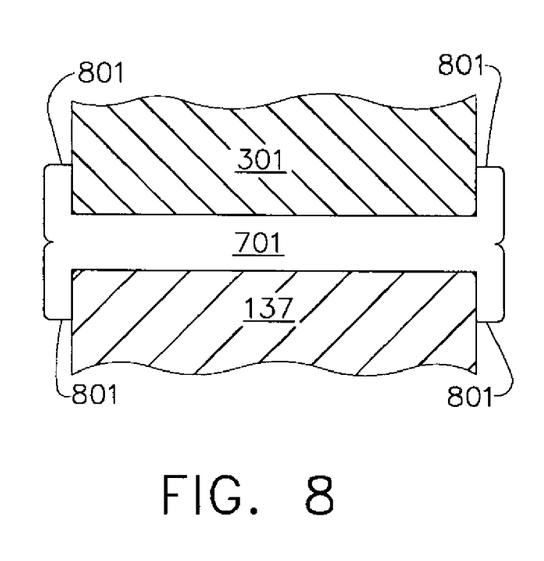
FIG. 8 shows an elevational sectioned view of a repaired ring gear assembly including a clip according to an embodiment of the present disclosure.
Figure 9:
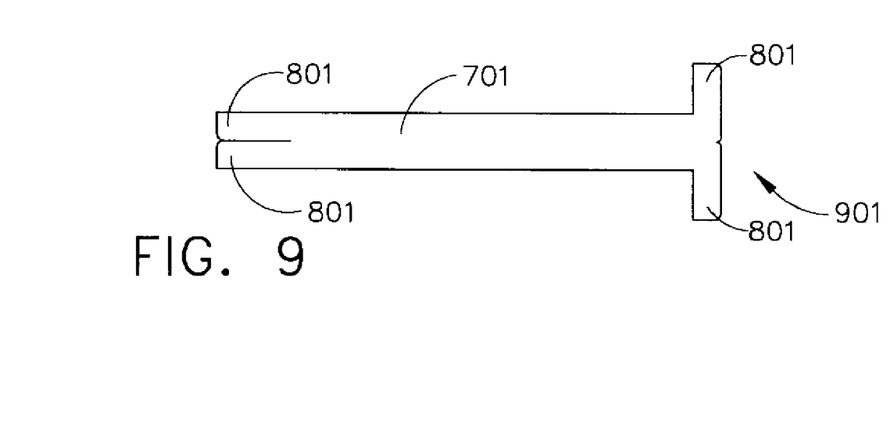
FIG. 9 shows side view of an uninstalled clip according to an embodiment of the present disclosure.

FIG. 7 shows a repair segment 301 having a dovetail geometry installed into a repair cavity 303 and clip slot 601 with a clip 701 disposed therein. The clip is configured with arms 801 (see FIG. 8) which, when bent, provide a locking or retaining of the clip 701 and the repair segment 301 in position, wherein the disengagement of the repair segment 301 from the ring assembly 137 is substantially prevented. As shown in FIG. 8, the bent arms 801 are disposed at distal ends of the clip 701 and provide retention and engagement of both the repair segment 301 and the ring assembly 137. FIG. 9 shows clip 701 prior to insertion into the clip slot 601, wherein a first end 901 includes arms 801 in a bent position. The clip 701 further includes unbent arms 801 which is insertable into clip slot 601.

Figure 10:
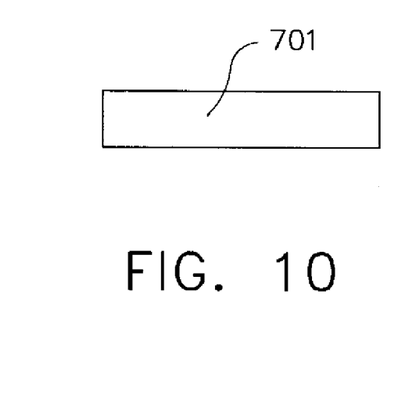
FIG. 10 shows side view of a clip according to another embodiment of the present disclosure.

An alternate configuration for clip 701 is shown in FIG. 10, wherein the clip 701 includes a wedge geometry or shim that is insertable into clip slot 601. The wedge shaped clip 701 may be forced into the clip slot 601 sufficient to provide a frictional interference fit between the repair segment 301 and the ring assembly 137.

Figure 11:
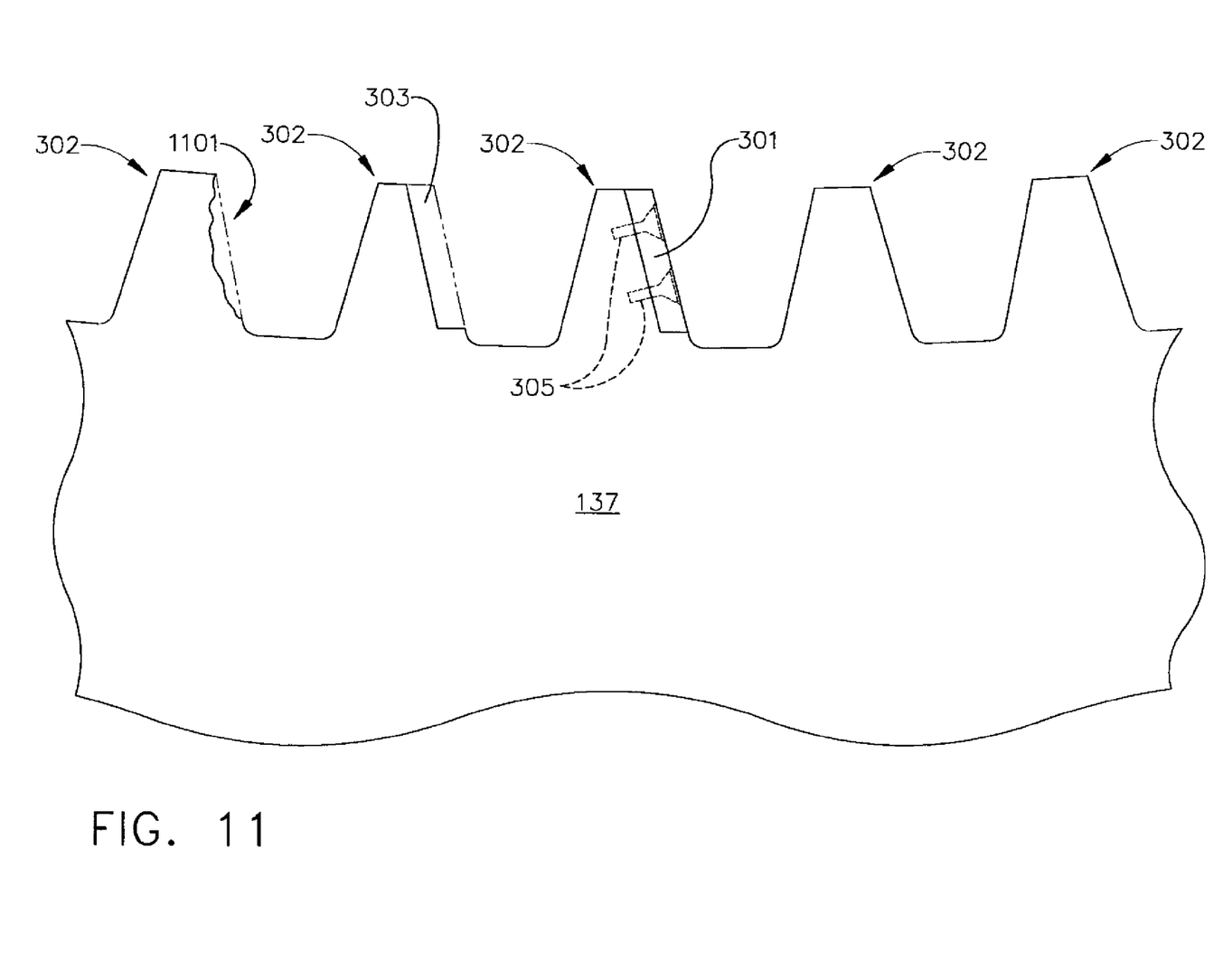
FIG. 11 shows an elevational side view of a repaired ring gear tooth and assembly according to another embodiment of the present disclosure.
Figure 12:
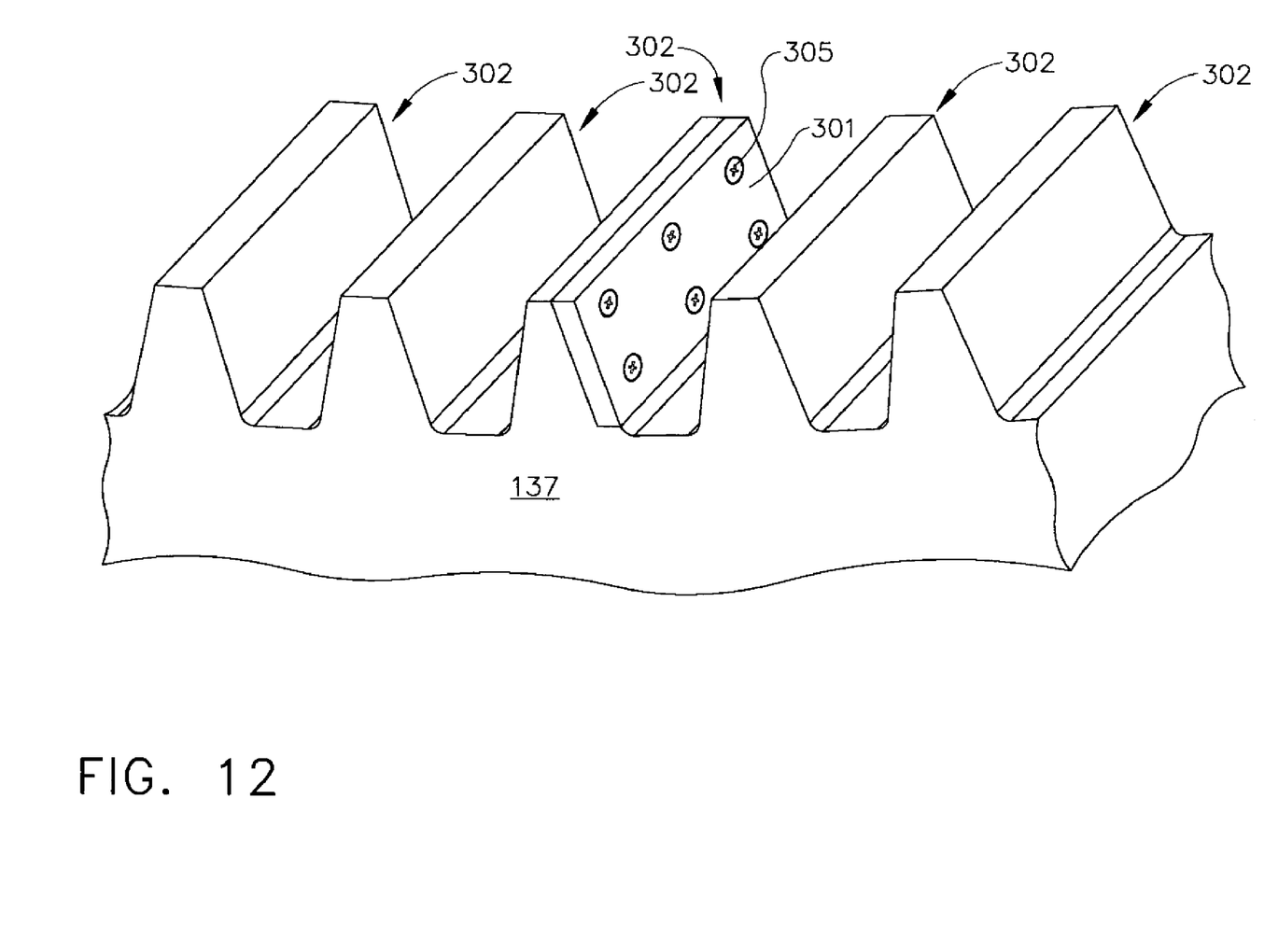
FIG. 12 shows a top perspective view of a repaired ring gear tooth and assembly according to an embodiment of the present disclosure.

FIG. 11 shows still another embodiment of the present disclosure, wherein one tooth 302 includes a damaged portion 1101, a second tooth includes removed material forming a repair cavity 303 and a repaired tooth 302 having a repair segment 301 fastened thereto. The damaged portion 1101 is removed by milling or other machining process to form a repair cavity 303. A repair segment 301 configured to mate the repair cavity 303 is fastened to the tooth 302 of ring assembly 137 by fasteners 305. In addition, FIG. 12 shows a perspective view of a repaired ring assembly 137 having a repair segment 301, as described above with respect to FIG. 11. As shown in FIG. 12, the resultant repaired ring assembly 137 includes a geometry for tooth 302 having substantially identical geometry as a tooth 302 that was undamaged.

Figure 13:
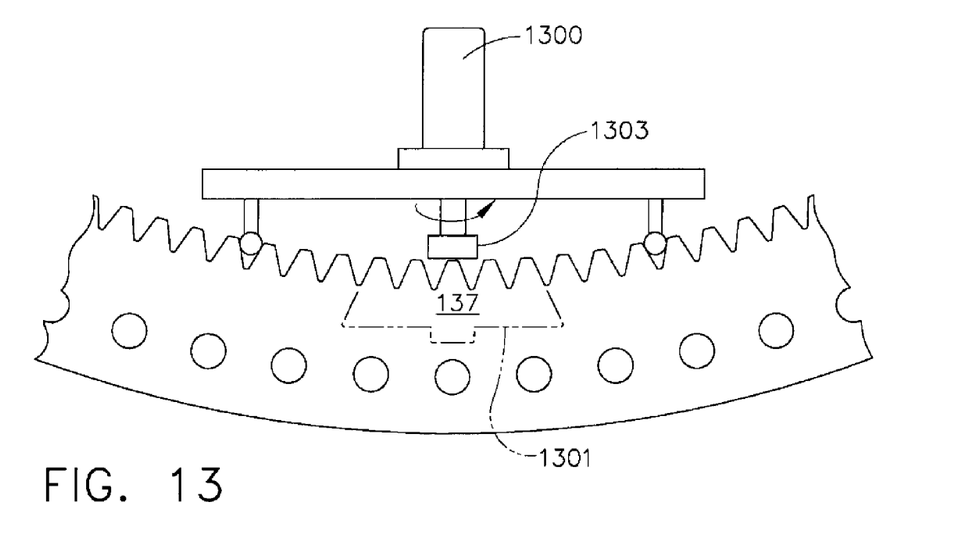
FIGS. 13-15 illustrate a repair apparatus and method according to an embodiment of the present disclosure.
Figure 14:
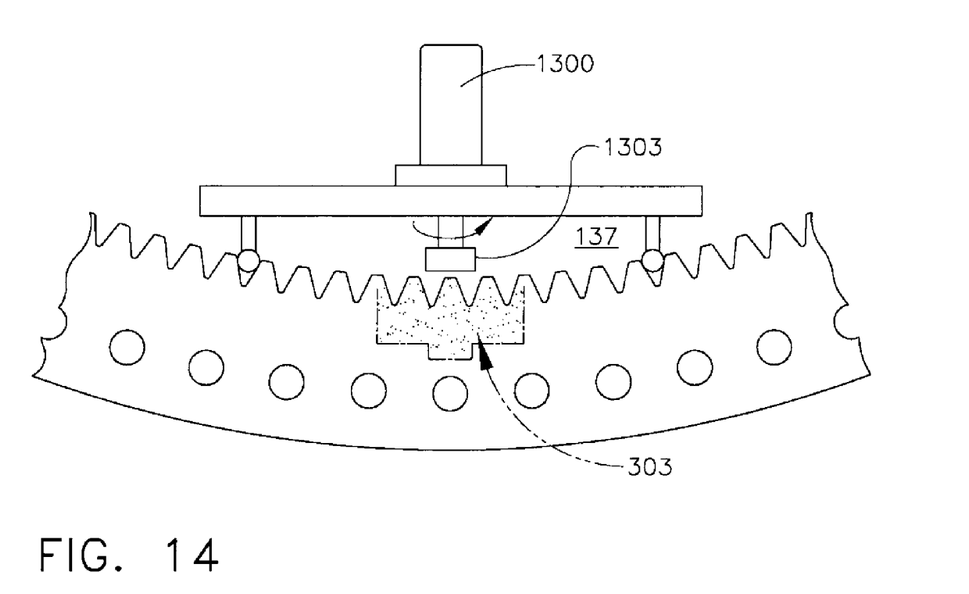
Figure 15:
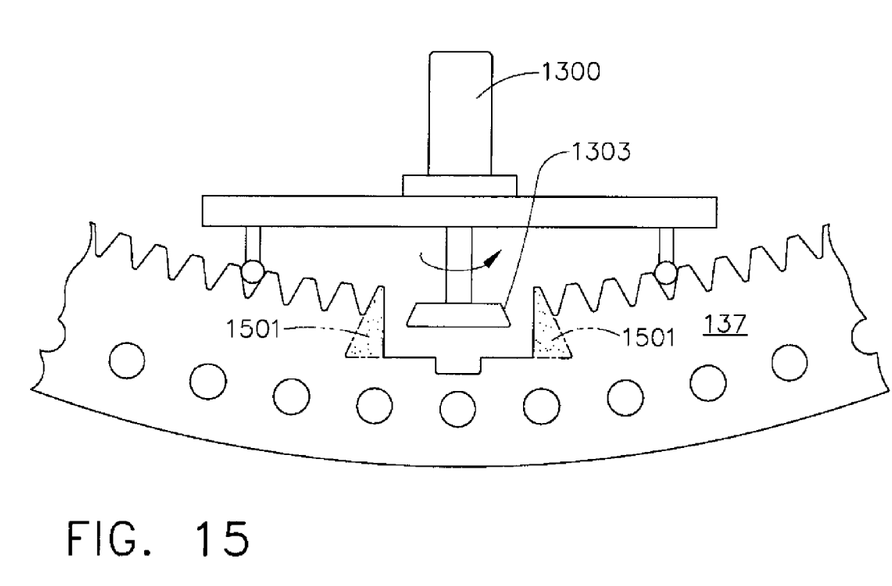

FIGS. 13-15 illustrate a method according to an embodiment of the disclosure to form a dovetail slot geometry to receive a repair segment 301, as shown and described with respect to FIG. 6. FIG. 13 shows a portable milling apparatus 1300 positioned above a damaged portion 1301. Milling apparatus 1300 includes a bit 1303 that rotates and provides material removal. The process of the present disclosure is preferably in situ, wherein few, if any, components are removed from the wind turbine 100 prior to forming the repair cavity 303. The milling is preferably performed without inducing any significant heat into the ring assembly 137 and surrounding components in addition to avoiding the removal of major components within the wind turbine 100. FIG. 14 shows a portion of the repair cavity 303 formed from the milling. As discussed above with respect to FIG. 6, the dovetail geometry of the repair segment 301 utilizes an interlocking geometry wherein sloped segments 1501 (see FIG. 15) are milled. A sloped bit 1303 may be utilized to remove additional material along sloped segment 1501 to form the repair cavity 303. The repair cavity 303 may be measured and the repair segment 301 may be fabricated to mate the geometry of the repair cavity 303. As discussed above, the formation of the repair cavity 303 may be performed on-site or off-site and may include formation according to any know machining or forming technique. The repair portion is then returned and installed, as discussed above in FIGS. 3-12 above. Although FIGS. 13-15 show a dovetail geometry, the method shown is not so limited and may be utilized to form the repair segment 301 shown in, for example, FIG. 3 or 11.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for repairing a hub pitch gear assembly comprising:
   providing a ring assembly for adjusting a pitch angle of a wind turbine blade having a plurality of gear teeth;
   removing a portion of the ring assembly including at least one gear tooth of the plurality of gear teeth, to form a repair cavity, the repair cavity including a cavity formed on a single tooth in the ring assembly;
   providing a repair segment configured to mate with the repair cavity, the repair segment being fastened to the single tooth and having a substantially identical geometry as an undamaged tooth that fits the cavity; and
   directing the repair segment into the repair cavity and fastening the repair segment in position.

2. The method of claim 1, wherein the repair segment includes one or more openings configured to receive a fastener.

3. The method of claim 1, wherein the repair cavity is configured with features to facilitate fastening or alignment of the repair segment.

4. The method of claim 1, wherein the repair segment is configured with features to facilitate fastening or alignment of the repair segment.

5. The method of claim 1, wherein the repair segment is configured into a dovetail having a geometry configured to mate with the repair cavity having a dovetail slot geometry.

6. The method of claim 1, wherein the removing comprises removing a portion of one of the plurality of gear teeth.

7. The method of claim 1, wherein the removing of the portion takes place in situ.

8. The method of claim 1, wherein the fastening includes substantially no welding.

9. A repaired pitch gear assembly comprising:
   a pinion assembly having a plurality of gear teeth;
   a ring assembly for adjusting a pitch angle of a wind turbine blade having a plurality of gear teeth configured to mesh the gear teeth of the pinion assembly, the ring assembly including a repair segment having a substantially identical geometry as an undamaged tooth, the repair segment being positioned in a repair cavity formed on a single tooth of the ring assembly; and
   wherein the repair segment mates with the repair cavity and is fastened to the ring assembly.

10. The assembly of claim 9, wherein the repair segment includes one or more fasteners fastening the repair segment to the ring assembly.

11. The assembly of claim 9, wherein the repair segment is configured with features to facilitate fastening or alignment of the repair segment.

12. A repaired pitch gear assembly comprising:
a pinion assembly having a plurality of gear teeth;
a ring assembly for adjusting a pitch angle of a wind turbine blade having a plurality of gear teeth configured to mesh the gear teeth of the pinion assembly, the ring assembly including a repair segment positioned in a repair cavity of the ring assembly;
wherein one or more clips are arranged intermediate to the repair segment and the ring assembly, and
wherein the repair segment mates with the repair cavity and is fastened to the ring assembly with the one or more clips.

13. The assembly of claim 12, wherein the one or more clips have a wedge geometry.

14. The assembly of claim 12, wherein a tooth includes the repair segment and forms a repaired tooth having a substantially identical geometry as an undamaged tooth.

15. A wind turbine comprising:
a wind turbine blade having an adjustable pitch angle;
a pitch gear assembly operably disposed to adjust the pitch angle of the wind turbine blade, the pitch gear assembly comprising:
a pinion assembly having a plurality of gear teeth;
a ring assembly for adjusting a pitch angle of a wind turbine blade having a plurality of gear teeth configured to mesh the gear teeth of the pinion assembly, the ring assembly including a repair segment having a substantially identical geometry as an undamaged tooth, the repair segment being positioned in a repair cavity formed on a single tooth of the ring assembly; and
wherein the repair segment mates with the repair cavity and is fastened to the ring assembly.

16. The wind turbine of claim 15, wherein the repair segment is configured with features to facilitate fastening or alignment of the repair segment in position.

17. The wind turbine of claim 15, wherein the repair segment includes one or more fasteners fastening the repair segment to the ring assembly.

18. A wind turbine comprising:
a wind turbine blade having an adjustable pitch angle;
a pitch gear assembly operably disposed to adjust the pitch angle of the wind turbine blade, the pitch gear assembly comprising:
a pinion assembly having a plurality of gear teeth;
a ring assembly for adjusting a pitch angle of a wind turbine blade having a plurality of gear teeth configured to mesh the gear teeth of the pinion assembly, the ring assembly including a repair segment positioned in a repair cavity of the ring assembly;
wherein one or more clips are arranged intermediate to the repair segment and the ring assembly; and
wherein the repair segment mates with the repair cavity and is fastened to the ring assembly with the one or more clips.

19. The wind turbine of claim 18, wherein the one or more clips have a wedge geometry.

20. A method for repairing a hub pitch gear assembly comprising:
providing a ring assembly for adjusting a pitch angle of a wind turbine blade having a plurality of gear teeth;
removing a portion of the ring assembly including at least one gear tooth of the plurality of gear teeth, to form a repair cavity, the repair cavity including a cavity formed in the ring assembly;
providing a repair segment configured to mate with the repair cavity, the repair segment having a geometry that fits the cavity,
providing one or more clips are arranged intermediate to the repair segment and the ring assembly; and
directing the repair segment into the repair cavity and fastening the repair segment in position with the one or more clips.

\* \* \* \* \*